United States Patent [19]

Franz, Jr.

[11] 4,090,115

[45] May 16, 1978

[54] TRANSIT VEHICLE CHOPPER CONTROL APPARATUS AND METHOD

[75] Inventor: James H. Franz, Jr., Murrysville, Pa.

[73] Assignee: Westinghouse Electric Corp., Pittsburgh, Pa.

[21] Appl. No.: 709,687

[22] Filed: Jul. 29, 1976

[51] Int. Cl.² .................. H02P 5/06; H02P 5/34; H02P 7/06

[52] U.S. Cl. .................. 318/341; 318/139; 318/345 E

[58] Field of Search .......... 318/341, 139, 599, 345 E, 318/345 F, 345 G, 345 H, 346

[56] References Cited

U.S. PATENT DOCUMENTS

| | | | |
|---|---|---|---|
| 3,689,818 | 9/1972 | Morton et al. | 318/341 |
| 3,716,767 | 2/1973 | Kuriyama et al. | 318/139 |
| 3,753,155 | 8/1973 | Opal et al. | 318/341 |
| 3,818,291 | 6/1974 | Miyake | 318/341 |
| 3,855,520 | 12/1974 | Stich | 318/139 |

OTHER PUBLICATIONS

Electronics, "Microprocessors", 4/15/76, pp. 78-100.

Primary Examiner—Robert K. Schaefer
Assistant Examiner—Eugene S. Indyk
Attorney, Agent, or Firm—R. G. Brodahl

[57] ABSTRACT

There is disclosed a programmed microprocessor control apparatus and method for transit vehicle electric motor through operation of a chopper apparatus. The microprocessor program establishes a boost signal for every program cycle of operation, including an ON control pulse positioned within the boost signal. The chopper operation monitors the provision of the boost signal to maintain the operation of the chopper motor control apparatus as determined by keeping the power supply line switch closed.

9 Claims, 8 Drawing Figures

TRANSIT VEHICLE CHOPPER CONTROL APPARATUS AND METHOD

CROSS REFERENCE TO RELATED APPLICATIONS

The present application is related to the following concurrently filed patent applications which are assigned to the same assignee as the present application, the respective disclosures of which are incorporated herein by reference:

Ser. No. 709,821, which was filed on July 29, 1976, by T. C. Matty and is entitled Transit Vehicle Propulsion Motor Effort Control Method And Apparatus;

Ser. No. 709,686, which was filed on July, 29, 1976 by L. W. Anderson, J. H. Franz and T. C. Matty and entitled Transit Vehicle Motor Operation Control Apparatus And Method;

Ser. No. 709,685, which was filed on July 29, 1976 by L. W. Anderson and J. H. Franz and entitled Transit Vehicle Generated Voltage Control Apparatus And Method; and Ser. No. 709,684, which was filed on July 29, 1976 by T. C. Matty and J. H. Franz and entitled Transit Vehicle Electrical Brake Control Apparatus And Method.

BACKGROUND OF THE INVENTION

The present invention relates to the application of thyristor chopper apparatus for determining the propulsion power and electric brake operations of a transit vehicle having series propulsion motors, and more particularly to control apparatus including a microprocessor that is programmed for the desired control of such thyristor chopper apparatus.

Direct current power has been supplied to the series propulsion motors of a transit vehicle with a thyristor chopper, such as disclosed in U.S. Pat. No. 3,530,503 of H. C. Appelo et al, for controlling the acceleration and speed of the vehicle by turning the propulsion motor current ON and OFF in a predetermined pattern. The thyristor chopper can provide either regenerative braking or dynamic braking when braking is desired.

In an article entitled Automatic Train Control Concepts Are Implemented By Modern Equipment published in the Westinghouse Engineer for September 1972 at pages 145 to 151, and in an article entitled "Propulsion Control For Passenger Trains Provides High Speed Service" published in the Westinghouse Engineer for September 1970 at pages 143 to 149, there is described the operation of the P signal for controlling all powered vehicles in a train to contribute the same amount of propulsion or braking effort.

In an article entitled Alternative Systems For Rapid Transit Propulsion And Electrical Braking, published in the Westinghouse Engineer for March, 1973, at pages 34–41, there is described a thyristor chopper control system for propulsion and electrical braking of transit vehicles. The thyristor chopper provides a propulsion system that is superior in smoothness and ease of maintaining a given speed, which latter feature provides the desired automatic train control. Moreover, the thyristor system makes regenerative braking practical because the response is fast enough to continuously match regenerated voltage to line voltage, and that matching prevents excursions in braking current and torque due to sudden transients in line voltage. the reduction in power consumption that results from regenerative braking can be significant, but another advantage is in relation to minimizing heat input to tunnels otherwise caused by dynamic braking.

The use of presently available microprocessor devices, such as the Intel 8080 family of devices, is described in a published article entitled "Microprocessors — Designers Gain New Freedom As Options Multiply" in Electronics Magazine for Apr. 15, 1976 at page 78 and in a published article entitled "Is There a High-Level Language In Your Microcomputer's Future?" in EDN Magazine for May 20, 1976 at page 62.

SUMMARY OF THE PRESENT INVENTION

A programmed microprocessor apparatus establishes a boost signal, for controlling the operation of a transit vehicle electric motor chopper apparatus, every cycle of the program operation including an ON control pulse positioned within the boost signal. The chopper operation monitors the provision of the boost signal to determine the proper operation of the programmed microprocessor apparatus and to maintain the operation of the chopper motor control apparatus.

DESCRIPTION OF A PREFERRED EMBODIMENT

Figure 1:
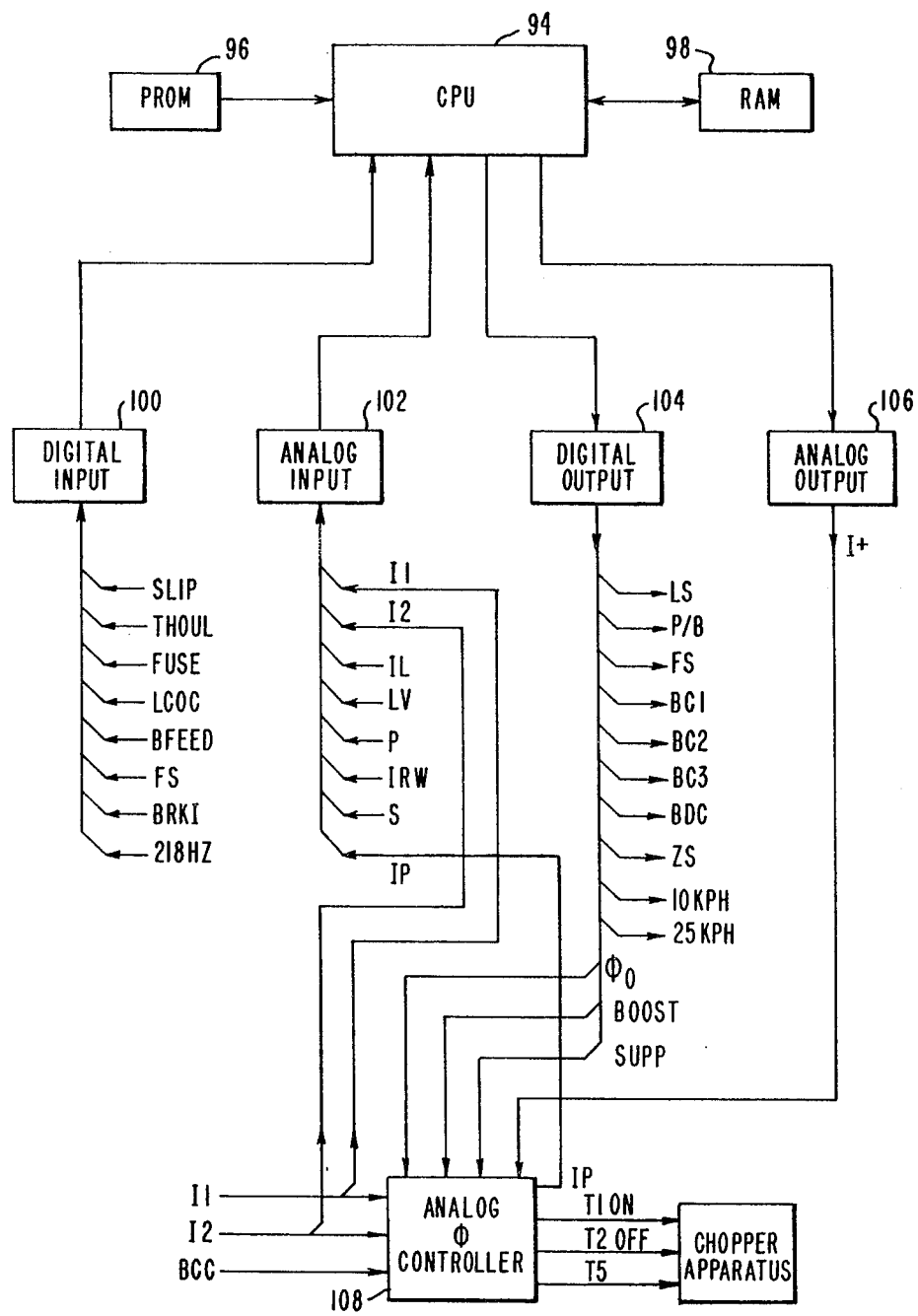
FIG. 1 is a functional showing of the present control apparatus in relation to the input signals and the output signals operative with the control apparatus.

In FIG. 1 there is shown a functional illustration of the present control apparatus in relation to the input signals and the output signals operative therewith, and including a CPU microprocessor 94 operative with a PROM programmable memory 96 and a scratch pad RAM random access memory 98 used for intermediate storage. The application program, in accordance with the program listing included in the Appendix, is stored in the programmable memory 96. The microprocessor 94 can be an INTEL 8080, the random access memory 98 can be an INTEL 8101, and the programmable memory 96 can be an INTEL 1702 programmable read only memory, which items are currently available in the open marketplace. There are four illustrated categories of input and output signals relative to the processor controlled operation of a transit vehicle. The digital input signals are supplied through digital input 100 from the transit vehicle and include the slip slide signal SLIP, the thyristor temperature sensor thermal overload signal THOUL, the effective value of the line filter capacitor as indicated by the fuse counter signal FUSE, the power circuit condition indication signal LCOC, the power and brake feedback signal BFEED, the field shunt feedback signal FS, the brake status signal BRKI and the clock signal 218HZ. The analog input signals are supplied through analog input 102 and include the first propulsion motor leg current I1, the second propulsion motor leg current I2, the line current IL, the line voltage LV, the primary power request or brake request control signal P, the air pressure in the vehicle support bag members providing load weighed current request signal IRW, the analog phase signal IP and the vehicle actual speed signal S1. The digital output signals are supplied through digital output 104 to the controlled transit vehicle and include the line switch control signal LS, the power brake mode control signal P/B, the field shunt control signal FS, the first braking resistor control signal BC1, the second braking resistor control signal BC2, the third braking resistor control signal BC3, the zero ohm field shunt control signal BDC, the 10 kilometer per hour signal 10 KPH, the 25 kilometer per hour signal 25 KPH, the phase zero control signal $\phi_o$, the timing control signal BOOST, the ON suppress control signal SUPP and the zero speed signal ZS. The analog output current request signal I+ is supplied through analog output 106 going to an analog phase controller 108 operative to supply the control signal ON to fire the chopper thyristor TI, the control signal OFF to fire the commutating chopper thyristor T3, the control signal T5 for the T5 thyristor in the propulsion motor control chopper apparatus and the analog phase indication signal IP going to analog input 102. The time period associated with turning the chopper ON and OFF is at a constant frequency of 218 Hz, that defines the clock time interval for the program cycle and for checking the process operation. During each of the 218 time intervals per second, the program cycle operates through the application program. It was necessary in the prior art for some of the input signals to be filtered to slow down the effects of noise transients and the like, but the computer program now samples the input signals 218 times every second, so if desired each signal can be checked during each program cycle and, if the signal stays the same as it was before, the proper response can be provided. By sampling all the input signals every program cycle and by addressing every output signal every program cycle, if noise transients are received, their effect can be minimized or eliminated. In relation to output signals, a correct output can be given 5 milliseconds later, which is faster than the power response time of the propulstion motor. In relation to input signals, digital filtering by comparison with old data can eliminate transient effects.

The train control system operative with each vehicle provides a P signal which selects a desired propulsion effort and this signal, as will be described in relation to FIG. 5, goes from 0 to 100 milliamps and establishes how much propulsion power or braking effort is desired by a particular train vehicle. The P signal is decoded to determine the proper motor current to generate the proper effort. In addition, there is a confirming signal, called the BRKI signal which determines when propulsion power and when braking effort is applied. The purpose of the BRKI signal is to control the power switching at the correct time to avoid one car braking while another car is in propulsion. Contact closures in the power circuitry are detected to establish that the power contacts have been made up properly and to readjust the settings in the logic. For instance, in field shunt operation, the amount of motor current is adjusted to keep from getting an undesired physical jerk of the vehicle. A failsafe reading of the P signal level is made such that, should the P signal be lost, the train control automatically goes into a brake mode. The present propulsion control apparatus determines which switches to close and when to close them to modify the power circuit properly. A dynamic brake feedback signal is sent to the mechanical brake control for providing the blending of mechanical brake necessary to maintain the deceleration level required by the P signal. The P signal is in reality a vehicle acceleration or deceleration request.

The propulsion control apparatus provides output pulses to the main power thyristors to tell them when to turn ON and when to turn OFF. When a command signal is sensed, for example, if the vehicle is in propulsion or power mode and the command signal desires the vehicle to brake, the control apparatus senses any difference between the desired motor current and the actual motor current and ramps down the actual current as required. When the current gets down to a desired level, the control apparatus opens all the propulsion switches and reconnects for a brake operation, then ramps the motor current back up again to the level established by the desired brake operation.

Figure 2:
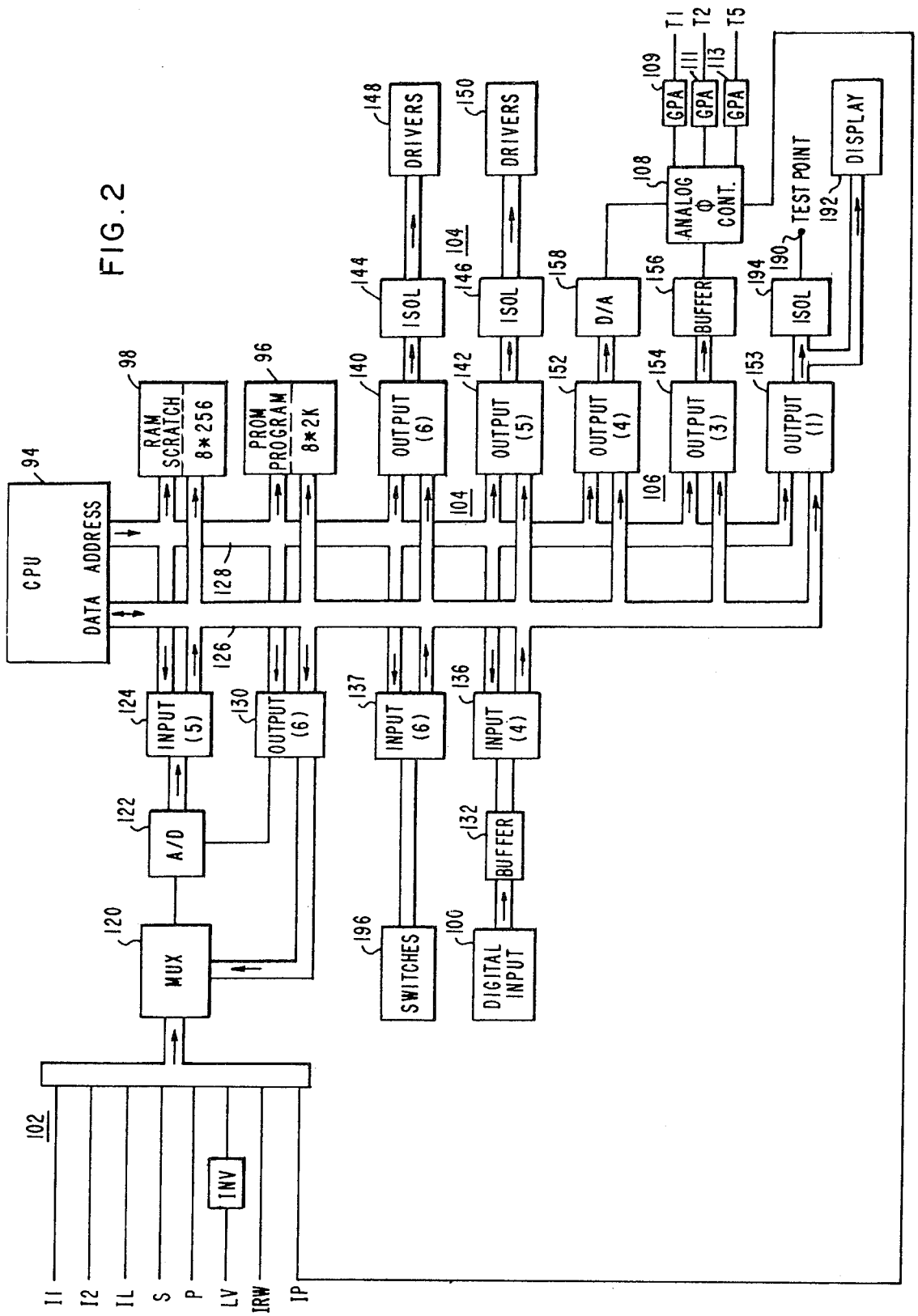
FIG. 2 illustrates the input signal operations and the output signal operations of the present control apparatus.

In FIG. 2 there is illustrated the input signal operations and the output signal operations of the present control apparatus, including the microprocessor 94 operative with its random access memory 98 and its programmable memory 96. The analog input signals are supplied through the analog input 102, through the multiplexer 120 and analog-to-digital converter 122 and input port 124 of the microprocessor 94 operative with a data bus 126 and the address bus 128. The address bus 128 and data bus 126 are operative through an output port 130 to control the multiplexer 120 and the analog-to-digital converter 122. The digital input signals are supplied through the digital input 100 operating through buffer 132 with the input port 136 operative with the data bus 126 and the address bus 128. The digital output signals are supplied through digital output 104 including output ports 140 and 142 and respective isolation circuits 144 and 146 with drivers 148 and 150 in relation to the data bus 126 and the address bus 128. The analog output 106 is operative through output ports 152 and 154 through a buffer 156 and a digital-to-analog converter 158 with the analog phase controller 108.

The central processor 94 addresses a particular input port or output port or memory location and then transmits data to, or receives data from, that location on the data bus 126. For example, the central processor 94 can address an input port, such as input port 124 for the analog-to-digital converter 122 and the multiplexer 120. First it presents data to output 130 to tell the multiplexer 120 which analog circuit input signal is desired with some sort of buffering, such as a differential amplifier or a low pass filter. When the particular input is addressed, the analog-to-digital converter 122 cycles converting that data. The digital feedback signals from the digital feedback 100 come in and can be read whenever desired. A monitor or display panel 192 can be provided to indicate the state of operation of the central processor 94. The output port 153 is operative through digital-to-analog converter and buffer amplifier 194 with the provided test point 190 and is operative with display 192. The manual switches 196 are operative with input port 137 as shown.

The P signal goes through the multiplexer 120 to request a particular vehicle operation. The control processor 94 senses the various currents, the various voltages and the vehicle speed. It takes digital feedback signals through buffers to know what is going on in the power circuit in relation to currents and voltages. The control processor 94 provides output command signals to the power circuit. Command signals go on the data bus and output ports function as latches so the control processor 94 can proceed to do other things while each latch remembers what is on the data bus at a given address. The control processor 94 outputs a signal to close whatever power switches are desired and also outputs a requested motor current. The requested current is decoded in a digital-to-analog converter. The analog motor control circuit, in response to this current request, senses the actual motor current and the commutating capacitor voltage, and if everything is satisfactory, the motor control circuit appropriately fires the drivers for the chopper apparatus.

Figure 5:
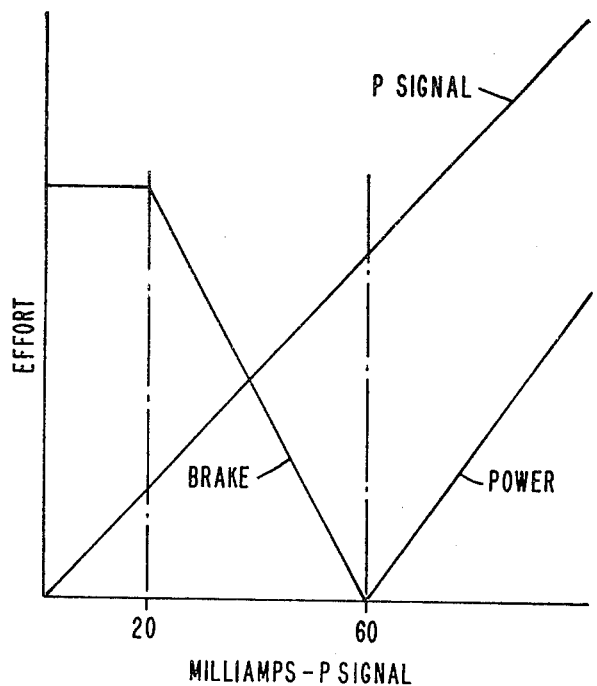
FIG. 5 shows the prior art response of a propulsion motor control apparatus to a P signal.

In relation to effort versus motor current, at up to about 100 amps, a typical series propulsion motor as shown by FIG. 5 provides little practical effort, and above 100 amps the characteristic looks more or less like a straight line. As speed increases, there is wind resistance, so the effective effort available is actually less in power, and in braking, the reverse is true. When power is requested, motor current comes up to the P signal requested level at a jerk limited rate. The vehicle increases its speed because of the effort supplied. The phase increases with speed, and when the phase approaches almost 100%, the full field operation is completed and the field shunt is used to weaken the motor field, and this provides a transient response problem; a very fast controller is required, such that it can properly control the phase on the thyristors. In actual practice, propulsion power is easier to control because in power a particular phase angle sets a percentage of line volts on the motor, and this will give a particular amount of motor current, such that if the phase is set at 50%, a particular amount of current is provided in power operation for a given speed. In brake operation, this same relationship is not true since brake operation is more unstable. If the phase is held at a desired place in power operation, the motor current is stable; if a particular phase setting is held in brake operation, the motor may go to overload or to zero. If it is desired to initiate brake operation, the control apparatus has to command brake which ramps down the motor current on a jerk limit, then opens up the power switches and reconnects the power switches for brake operation; thereafter, the control apparatus goes into brake operation and ramps up the motor current to give the torque necessary to get the desired brake effort. The motor may be generating a considerable voltage that goes back into the supply line so a resistor is put into the circuit to dissipate the excess voltage. As the vehicle comes down in speed, the motor counter EMF drops and the chopper can no longer sustain the motor current, so switches are operated to change the resistors to maintain the desired motor current. If the line voltage exceeds a particular value to indicate that the line is not receptive and won't accept the generated current, the motor current is reduced; if no dynamic braking resistor is used, with dynamic resistors in the circuit, and if the line voltage becomes excessive, the motor current is shunted into the dynamic braking resistor.

Figure 3A:
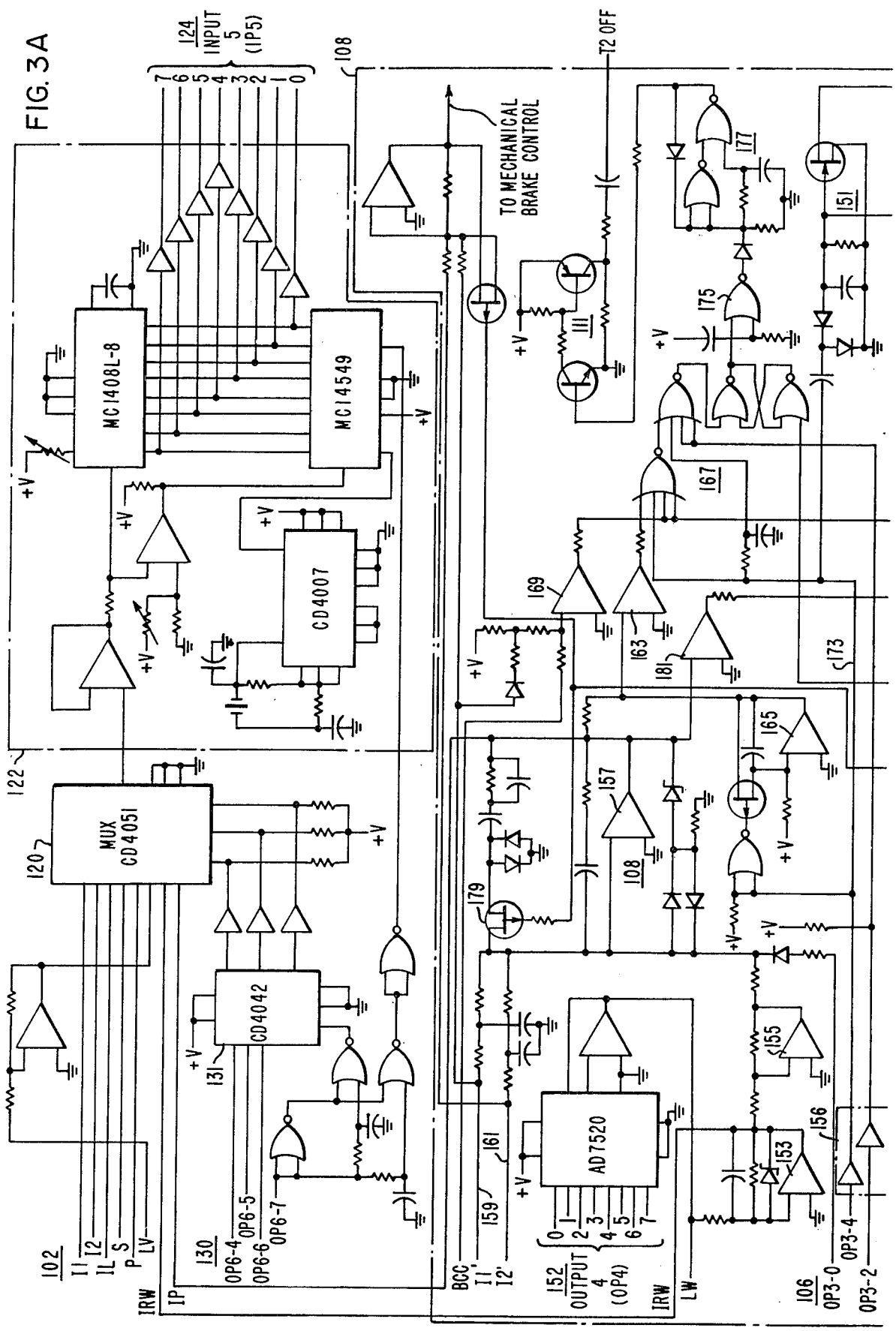
FIGS. 3A and 3B illustrate schematically the provided interface of the present control apparatus.
Figure 3B:
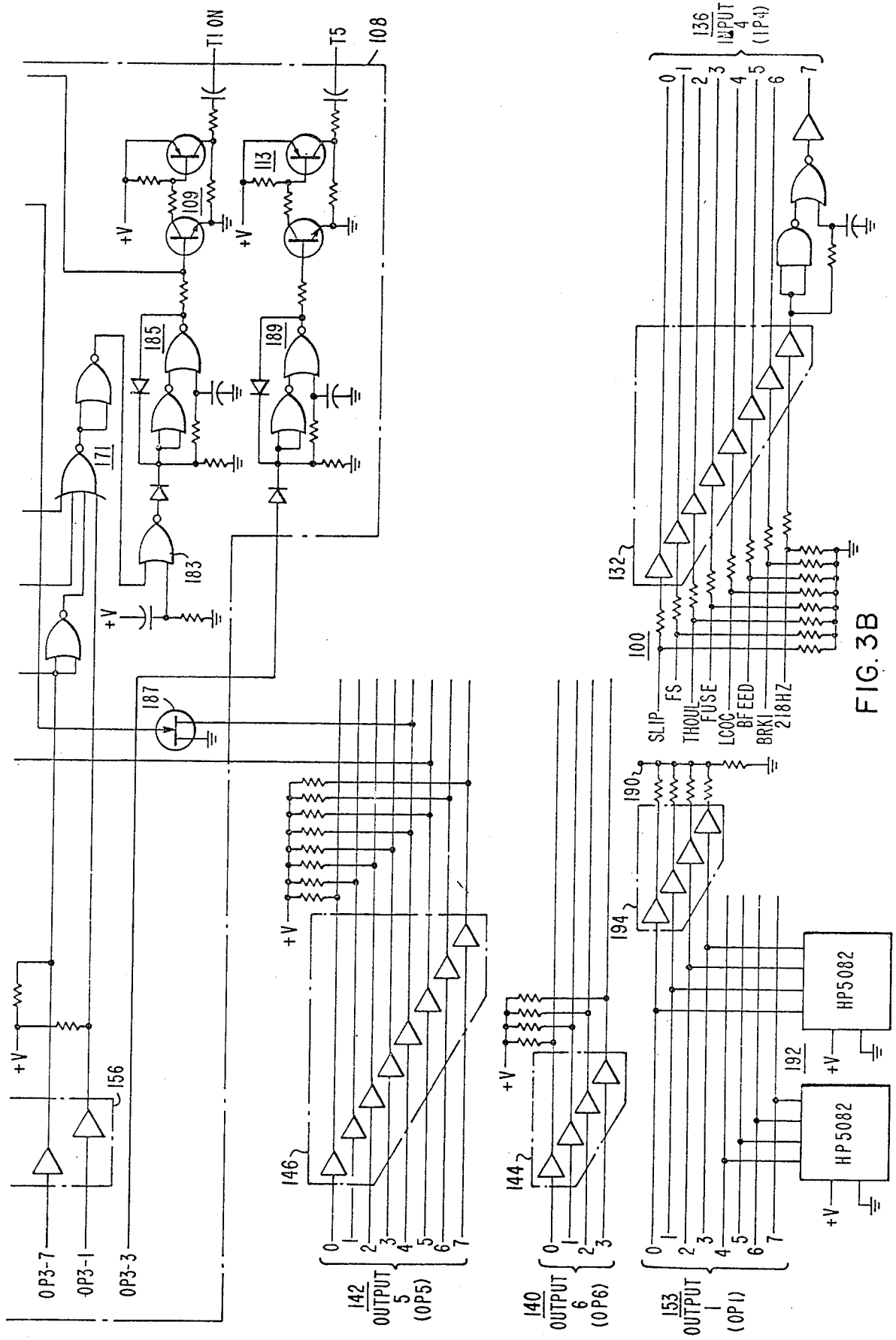

In FIGS. 3A and 3B there is schematically illustrated the provided interface of the present chopper logic control apparatus. The digital input 100 is shown in FIG. 3B operative through the buffers 132 with the input port 136. The analog input 102 is shown in FIG. 3A operative through multiplexer 120 and the analog to digital converter 122 with the input port 124 of the microprocessor. The output port 130 is operative with the register 131 to control the multiplexer 120 and the analog to digital converter 122. The output port 152 is shown in FIG. 3A operative with the digital to analog converter 158 and the analog phase controller 108; the output port 106 is shown in FIGS. 3A and 3B operative through buffer amplifiers 156 with the drivers 109, 111 and 113 for controlling the respective thyristors T1, T2 and T5. The output port 142 is shown in FIG. 3B operative with the isolation amplifiers 146. The output port 140 is shown in FIG. 3B operative with the isolation amplifiers 144. The output port 153 is shown in FIG. 3B operative with isolation amplifiers 194 and test point 190 and operative with display 192.

The pump circuit 151 operates to verify the proper working of the present control apparatus including the microprocessor 94 before the line switch is picked up and the desired propulsion motor control operation takes place. A dummy boost signal is initially put out at program line 16 to enable the line switch to be picked up, and during the main program operation if something goes wrong the boost signal disappears and the line switch drops out. The Y carrier shown in FIG. 4 has added to it the boost bit, and then time is called to wait as shown by the code sheet; the Y carrier indicates whether the OFF suppress or the ON suppress is called for.

The load weighed current request signal is output by amplifier 153. Then the buffer 155 leads to the phase controller amplifier 157, which takes the current request signal from buffer 155 and the motor current signals I1 and I2 from lines 159 and 161. The output of controller amplifier 157 is the requested OFF pulse position or the phase angle IP. The output of the amplifier 157 is compared by comparator 163 with the timing ramp from amplifier 165 which is reset by the computer each 218 hertz. The comparator 163 establishes when phase angle signal IP has exceeded the timing ramp, and this would determine at the output of comparator 163 where the OFF pulse is positioned. The logic block 167 determines whether or not the OFF pulse position output of comparator 163 is actually used. For example, if comparator 169 determines there is too much current in the system, the OFF pulse will be fired and might inhibit or suppress the ON pulse in logic block 171 which is operative with the ON pulse. The boost pulse comes from the computer and goes into the logic block 167 on line 173, and will fire an OFF pulse on the leading edge if comparator 169 has not already fired a pulse and suppress any further action out of the control system. The logic block 167 includes a flip-flop operative such that if an OFF pulse is fired once during a given program cycle, a second OFF pulse is not fired during that same program cycle. The power up restart circuit 175 suppresses pulses until the control system has time to operate properly. The circuit 177 is a monostable to assure that only a pulse is output, and circuit amplifier 111 drives the OFF pulse going to the gate pulse amplifier for thyristor T2. In power mode the FET switch 179 is closed to provide the desired motor characteristics compensation signal, and in brake mode, this switch is opened to provide a faster controller operation. The amplifier 181 checks the phase controller 157 to see if the signal IP is all the way up against the bottom stop to indicate too much current, and if so, the circuit 171 suppresses the ON pulses; this is used when starting up in power to skip ON pulses. The ON pulses are suppressed by the power up circuit 183. The ON pulses use the monostable 185 and the driver 109 as in the operation for the OFF pulses. The safety enable signal or pump circuit 151 will stop the firing of an ON pulse if repetitive boost signals are not provided. The FET switch 187 energizes the line switch output, such that if there is no activity on boost signal line 173, then the pump circuit 151 will cause FET switch 187 to keep the line switch dropped. The T5 signal comes from the computer to fire the T5 thyristor, and monostable 189 drives the driver circuit 191 going outside to the gated pulse amplifier for the T5 thyristor. The phase controller 108 includes the operational amplifier 157, with its attendant compensation for power and brake operations. The computer can force the controller 108 from output port 3-0 to zero for startup. The pumping circuit 151 checks the activity of the computer by looking at the boost line 173 for snubbing the provision of ON pulses and thereby controls the line switch. If the line switch is out, the propulsion and brake control system cannot operate the chopper apparatus, so if something is wrong, it is important to snub the ON pulses quickly, because the line switch takes time to drop out; for this reason an effort is made to stop the ON pulses when some control apparatus malfunction occurs and is sensed by the boost signals no longer being provided.

Figure 4:
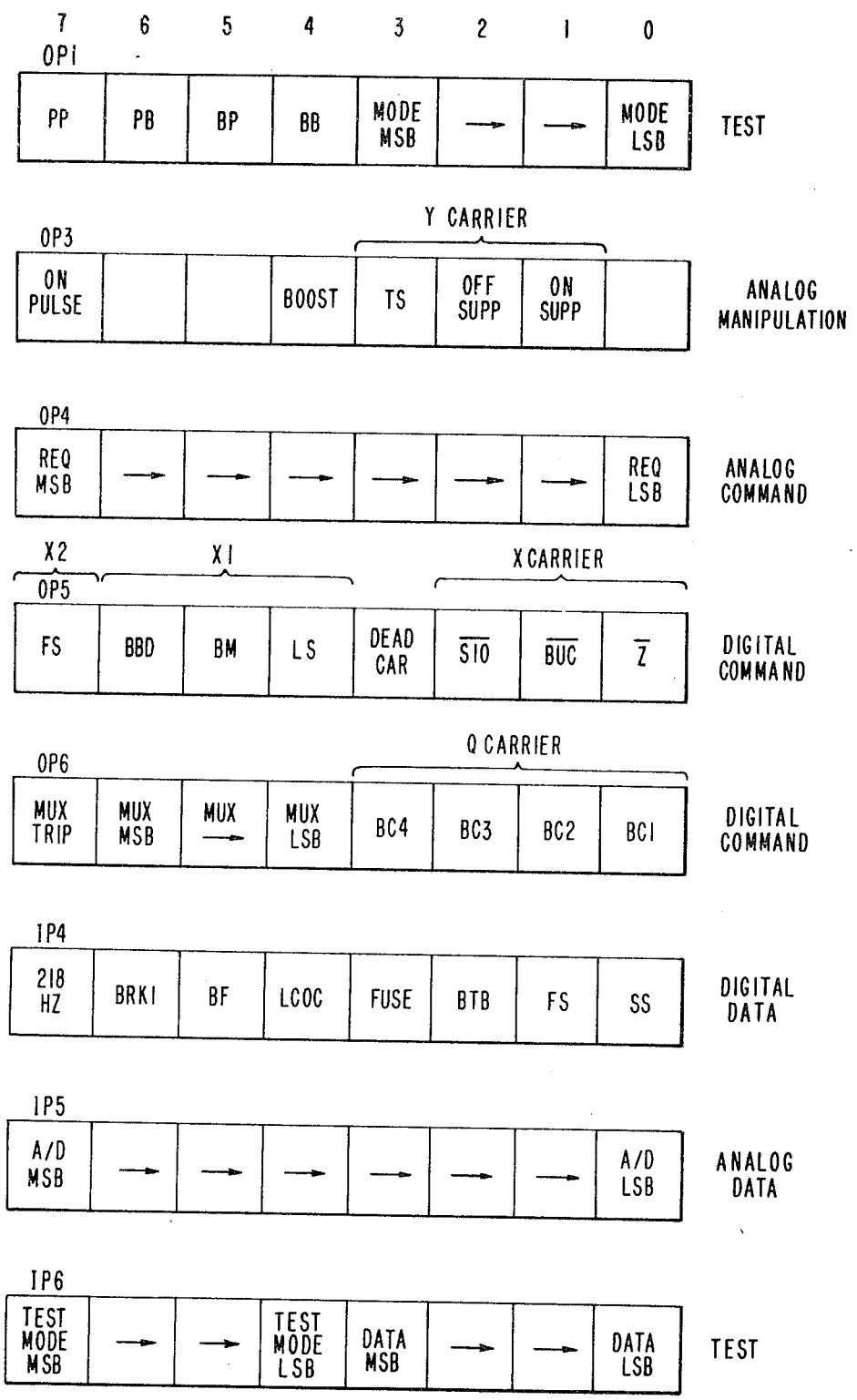
FIG. 4 illustrates the coding of the program listing included in the appendix.

FIG. 4 illustrates a code sheet that was used to develop the program listing included in the Appendix. As shown in FIG. 4 and in reference to FIG. 2, output port 1 (shown in FIG. 2 as 153) was used for a test mode, output port 3 (shown in FIG. 2 as 154) was used for analog manipulation, output port 4 (shown in FIG. 2 as 152) was used for analog command signal output, output port 5 (shown in FIG. 2 as 142) and output port 6 (shown in FIG. 2 divided into four bits each for 140 and 130) were used for digital command signal outputs, input port 4 (shown in FIG. 2 as 136) was used for digital input data, input port 5 (shown in FIG. 2 as 124) was used for analog input data and input port 6 (shown in FIG. 2 as 137) was used for test purposes in relation to manual input switches.

In FIG. 5 there is illustrated the well-known response of the propulsion motor control apparatus to the P signal 30. When the P signal 30 is below a value of about 60 milliamps, the control apparatus operates in the brake mode and for a P signal above this value of 60 milliamps, the control apparatus operates in the power mode.

Figure 6:
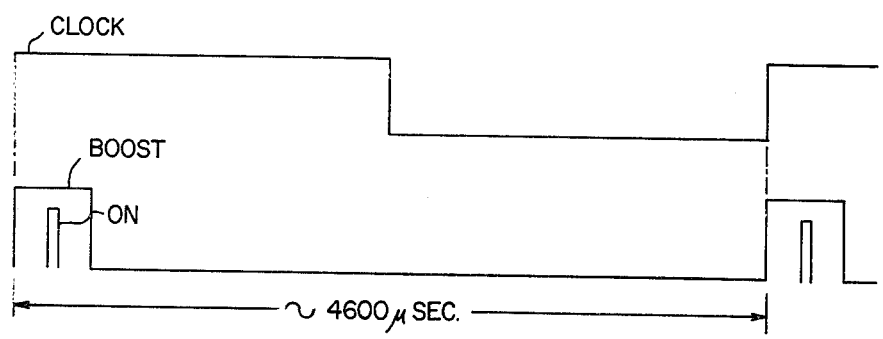
FIG. 6 shows the time relationships of the boost pulse, the ON signal within the boost pulse and the clock pulse.

The boost pulse signal is developed within mode 4 of the program, which is operative during every cycle of the program operation. The start of the boost pulse as shown in FIG. 6 is provided at program line 27. The position of the ON signal within the boost pulse is provided by program line 28, and the current request is provided at output four going to the digital to analog converter 158 and the analog phase controller 108 shown in FIG. 2. The P signal determines the current request I+ to the analog phase controller for establishing the ratio of ON to OFF operation of the chopper. The end of the boost pulse is provided by the program line 29.

Figure 7:
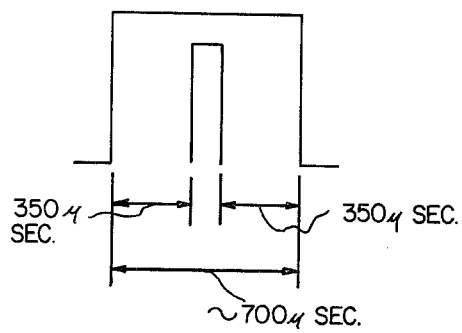
FIG. 7 shows in greater detail the time relationships of the boost pulse and the ON signal within the boost pulse.

If for some reason the program operation were to fail, the boost signal would not be provided. The pump circuit 151 shown in FIG. 3A must sense the provision of the successive boost signals, with one boost signal being provided for each cycle of the program operation, before the pump circuit 151 maintains an adequate output to enable the power supply line switch closed and not shut down the motor operation. The boost signal provides a protection time band during which an OFF pulse cannot be provided, which protection time band is selected in relation to the known operational speed of the microprocessor such that an OFF pulse cannot occur within a time period of 350 microseconds before the ON pulse and within a time period of 350 microseconds after the ON pulse as illustrated in FIG. 7. The guard protection time band is provided to the analog system operation, since the boost is used to release the OFF pulse. The OFF pulse can be defeated during the boost signal interval, and the ON pulse can be suppressed by the SUPPRESS signal from the digital output 104 if desired for some reason. An OFF pulse is allowed only outside of the boost signal, and the position of the boost signal protects the ON pulse in this regard, and thus the main chopper circuit.

By sensing the occurrence of the boost signal by the pump circuit 151, the pump circuit 151 will not maintain its output adequately to keep the supply line switch closed if the boost signal does not continue to occur in a regular and successive manner.

At program line 27, the output three provides the boost signal to the buffer 156 and the analog phase controller 108 as shown in FIG. 2. The microprocessor operates in a time sequential manner, so the command of program line 27 requires a known amount of time, which is 350 microseconds before the command of program line 28 is executed, and another 350 microseconds is then required before the command of program line 29 is executed. This provides the boost signal and the ON pulse positioned relationship shown in FIG. 7.

The Y carrier information determines the ON pulse as shown by the code sheet of FIG. 4. The inherent microprocessor operational time is utilized for the purpose of locating the ON pulse within the protection time band of the boost signal.

To provide the desired control system response characteristic in relation to a bandwidth consideration, the high speed analog phase controller is provided and controlled by providing the boost signal to protect the ON pulse and prevent an OFF pulse for a determined time period before and after the ON pulse and locating the ON pulse in a desired position, and then monitoring and continued and proper provision of the boost signal to maintain the operation of the chopper and subsequent motor control apparatus as determined by keeping the power supply line switch closed. The pump circuit 151 must be responsive to a sensitive signal to assure continued and proper operation and integrity of the program with the microprocessor. If the pump circuit 151 senses any failure in this regard, it will shut down the motor control system. An effort was made to select one of the most critical signals used by the program for this purpose, such as in relation to the location in the program where the boost signal is provided, and the program always goes through mode 4 during each program cycle of operation. In addition, the current request IR is provided during this same block of the program. Therefore the program operation must pass through the mode 4 block in order to keep the motor control system operational.

The analog phase controller can respond to an OFF pulse anywhere between the falling edge of one boost signal and the leading edge of the next succeeding boost signal, and this establishes the ON/OFF ratio of the chopper since the microprocessor puts out the ON pulse shown as $\phi_o$ in FIG. 1 and it puts out the boost pulse. The phase controller cannot fire the OFF pulse before the falling edge and cannot fire after the leading edge of the boost pulse, so the boost pulse in effect determines a dead band. The boost pulse is in the order of 700 microseconds long and the time cycle of the boost pulses is in the order of 4600 microseconds as determined by the clock pulse rate, so the OFF period is substantially larger than the boost pulse period. The analog phase controller can fire the OFF pulse anywhere during the total time cycle other than during the boost pulse. The ON pulse is timed by the microprocessor to be approximately in the middle of the boost pulse, with about 350 microseconds within the boost pulse before the ON pulse occurs and about 350 microseconds within the boost pulse after the ON pulse occurs, as shown in FIG. 7. This time relationship is required to allow the thyristor circuit of the chopper to complete the last received command signal; for example, after an OFF pulse is given to the thyristor T2 then this time period of about 350 microseconds is required before an ON pulse can be given to thyristor T1 to permit the chopper circuitry to reset properly for this operation. If the OFF pulse is not specifically suppressed before the leading edge of the next boost pulse, then an OFF pulse is fired by the phase controller, and after the leading edge of the boost pulse at about 350 microseconds an ON pulse is fired, if allowed. Normally, this ON pulse is allowed, but the ON pulse can be suppressed independently as well as the OFF pulse can be suppressed if desired. But in normal operation, the leading edge of the boost would be followed after about 350 microseconds by the ON pulse, and after another about 350 microseconds the falling edge of the boost pulse and the phase controller would then establish the desired ON/OFF time ratio by appropriately firing the OFF pulse in accordance with the current request signal I+. The pump circuit 151 responds to the boost pulse to allow any ON pulses to the fired and the line switch to close. This assures that the microprocessor is operating validly. If the microprocessor is operating properly, it will provide the boost signals to keep pumping the safety enable circuit, and if the microprocessor outputs the ON pulse every 1/218 second, the pump circuit 151 allows firing the ON pulse and will allow pick up of the line switch. If for some reason the microprocessor discontinues providing the boost signals, the safety enable circuit 151 will stop pumping and will shut down the chopper and the motor control operation. A repetitive input boost pulse to the pump circuit 151 is required at substantially the rate of one every 1/218 second to continue the enable output from the pump circuit.

The digital output provides the boost pulse to the analog phase controller. The clock initiates each program cycle and at the beginning of each cycle provides the leading edge of the boost, then the microprocessor counts for 350 microseconds and provides the ON pulse and then counts for 350 microseconds and provides the trailing edge of the boost pulse. After the boost interval, the program goes through its desired operations before the next boost pulse.

The pump circuit 151 verifies the proper working of the microprocessor before the line switch is picked up and the propulsion motor control function takes place. A dummy boost signal is initially put out to enable the line switch to be picked up, and during the main program operation if something goes wrong the boost signal disappears and the line switch drops out. The Y carrier has added to it the boost signal bit, and then time is called to wait as shown by the code sheet in FIG. 4; the Y carrier indicates whether either one or both of the OFF suppress or the ON suppress are called for.

The present control apparatus, including the microprocessor, is more reliable in terms of mean time between failures by a factor of 5 or 10 improvement as compared to the previous analog control system including some hard wired digital logic circuitry. If the prior art analog control system did fail, there was no provision for monitoring or sensing the proper and continued operation of that apparatus, such as here provided by the pump circuit 151 responding to the boost signal.

The program listing included in the Appendix is written in a language called PLM which was developed for use with the INTEL microprocessor, such as the central processor 94. This is a high level assembly language which can be compiled into machine language. The numbers used in the listing are in the hexadecimal number system, which is a base 16 number system. The first part of the listing in lines 1 to 6 is for bookkeeping purposes and identifies for the program the variables, the constants and the labels used in the course of the program. More specifically, K is an artificial constant that is set in the brake mode for controlling the brake build-up. IRW is the current request that has been load weighed to compensate for the weight of the car. I0 is the old current, I1 is one of the motor circuit currents and I2 is the other motor circuit current. IR is the current request. LVL is the modified line voltage. PR is the permission to regenerate. RE is the retard the effort due to a number of conditions such as overline voltage or overcurrent or the like. TI is a timer. IL is line current. LV is line voltage. M is the mode of the external equipment. MO is the old mode and M1 is the transitory mode as determined by the mode request and the position of the power brake switch. N is a counter. PH is the phase that the external analog controller is controlling and that is brought back in to establish the field shunting. PI is the P signal that is used internally to do mode changes, PN is the new presently read P signal and P0 is the jerk limited P signal. TT is a timer. SI is the speed after the hysteresis has been applied. TOS is blank. ZI and Q are carriers to the external analog controller and establishes certain modes of operation. S is the currently read speed signal and SS is the speed signal after it has been modified for the taper on the power and brake modes. T is a timer, TP is a timer and TS is a timer. X, X1, X2, Y and Z are external controls for the analog controller. The three upper lines in the program listing are the variables used in the program. The next three lines are labels that identify in the program certain starting points where the program can jump to if needed. The compiler assigns memory locations for each variable, and any time a given variable is read, the computer knows the memory location. The mode labels are used to assign locations in the program.

The program defines the desired sequence of steps to be followed in controlling the propulsion and electric braking operation of a transit vehicle. The safe mode of operation is the brake mode. Therefore, the present control program listing always starts up through the brake mode. If an abnormal condition is detected, the program operation returns to the beginning and resequences through the brake mode. In comparison, the prior art control systems shut the chopper OFF and didn't try to reinitialize the equipment or to make sure the start of the operation was always from the same base.

In line 8 and mode 1 of the program an output port is directed to take a certain state, which is output port 1, and the constant Q is initialized to equal zero. In lines 9 to 14 of mode 1 the program sets the output line switch out and checks if it is satisfactory and then reads the line voltage. The program looks at the inputs, the slip slides, and so forth to see that they are in proper form and then tests for line voltage. If the line voltage at line 14 is not satisfactory, the program goes back to line 8 and the start. If the line voltage is satisfactory, a false boost signal is output at line 16 of the program because the line switch cannot be picked up until a boost is provided, so a false boost is provided for this purpose. The motors will not be energized at this time because the ON and OFF pusles for the thyristors have been suppressed. If the line voltage is all right, then in line 17 of mode 2 of the program the line switch is closed for charging the commutating capacitors and a check is made at line 18 to see if all the inputs are as desired, and if they are satisfactory, the program at lines 20 and 21 initializes certain timer variables.

In line 24 of mode 3 of the program the program waits for a pulse from an external clock at 218 Hz from a crystal oscillator and when the program sees the rising edge of the clock pulse, it provides the front end of the boost to fire the ON pulse and puts the ON pulse positioner up to output the request through output port 106 shown in FIG. 3.

Lines 26 to 30 of mode 4 of the program are controlling the external analog phase controller 108 to provide a boost interval for interpreting the current signals and other things as to where the ON pulse will be and whether or not it is allowed, and providing the ON suppress and the OFF suppress.

In mode 5 lines 40 to 64, the program reads analog inputs and sets some variables. The P signal which is a linear monotonic type signal is converted to effort. When the P signal is above 60 milliamps as shown in FIG. 5, this is a power request, when the P signal is below 60 milliamps it is a brake request, and below 20 milliamps it is superbrake. If the line voltage LVL is less than some predetermined number then the operator RE is set to retard the effort. In addition, a speed taper is provided whereby the speed signal S is read in the outside world and is modified so that the internal speed signal SS stays at the given level as long as the external speed signal is within predetermined limits. The external speed S is the actual vehicle speed and the internal speed SS is the value that the program is using for its operations. In effect a window is put on the real vehicle speed and then used inside the program as a bracketed speed such that as the outside speed starts moving up, then the inside speed SS doesn't change for as long as the outside speed S is within this provided window, thereby if the outside speed S has noise interference, this provides a dead band for filtering the noise and other disturbances out of the actual speed signal S.

In lines 32 to 38 of mode 6, a determination is made to go to power or go to brake and to confirm that the control is in power or the control is in brake for the purpose of setting up the request.

Starting at line 65 of mode 7, the P signal is considered, which P signal has a value from 0 to 100, for the generation of requested effort. If the control is in power and the P signal is above 60 milliamps, this requires more effort. If the P signal is below 60 milliamps and the control is in power, this maintains a minimum effort. If the control is set in brake and the P signal is below 60 milliamps, this requests an increased brake effort down to 20 milliamps, at which time the same effort is held. If the P signal is above 60 milliamps but the BRK signal does not allow the control to go into power, a minimum brake effort is maintained. In addition, a jerk limit is provided in lines 75 to 82 of the program because the P signal can change instantly to a full 100 milliamps and must be jerk limited such that the effort signal has to increase on a ramp in one program cycle step at a time. The jerk limited P signal is incremented by one unit each program cycle to provide the desired ramp and repeatedly incrementing one at a time determines how quick the effort increases. When going into brake to prevent an abrupt fade-out of the electric motors and to permit a smoother blending of the friction brakes, a false fade-out is provided in lines 84 to 89 of the program so the electric braking fades out on a softer slope to permit the friction brakes to maintain a smooth and total braking effort.

Lines 94 to 98 of mode 8 of the program provides a check for a zero speed when the actual speed is less than a defined amount such that the vehicle is considered to be standing still at zero speed. In addition, zero speed clears the Z carrier within the program used in a situation when there is too much current in brake, which indicates an overload and the operation should be shut down. In line 99 of the program, if the vehicle is at zero speed and a request for power is received, then the Z carrier is cleared to go back into power. A check is made at line 100 to see if the line voltage is too low, and if it is too low, the program returns to the beginning of the program since there is not enough energy for the commutating capacitor and the present control apparatus is not required to operate below a predetermined voltage level, which could mean that the vehicle is operating in a rail gap and the normal mode is to shut down the equipment when going into a rail gap. In addition in line 101 of mode 8, a check is made for excessive line voltage which is used for incrementing the RE request. If the voltage is too high, the Y carrier is set for the purpose of skipping ON pulses and the RE request starts reducing the motor current and this reduces the line current. A check is made for LCOC which is a signal that indicates that all the power circuitry is made up properly. If any of the conditions, such as a thermal overload or a slip/slide signal or the like, indicates improper action, the effort request is reduced and a suppression of the ON pulse is effected. The Y carrier controls the ON pulse, the OFF pulse and the T5 pulse. A check is made to see if motor current I1 is greater than motor current I2 or vice versa to maintain the desired balance in the motors. A check is made at line 105 to see that I0, which is a sum of I1 and I2, is not exceeding the request IR by more than a certain amount; and if it is, the ON pulses are skipped.

The line current limit check in line 103 of mode 8 is provided to establish that the respective currents in each of the motor circuits are within a predetermined match of each other in relation to balance; if they are, the operation is satisfactory; and if not, corrective action is taken. Towing protection is provided in line 104 to enable a train vehicle to be pulled or towed; if there is a failure in the external equipment of a given vehicle, it is desired that this be recognized and the vehicle operated such that the other operating cars in the train can tow the disabled vehicle.

In lines 110 to 113 of mode 9 of the program the current request is generated from the PR signal from which the retard effort RE is subtracted to get the IR request signal, and a speed tilt is provided in relation to a power mode or brake mode of operation to change the current request IR on the field shunt and check of the inputs. The effort request is the modified P signal which has been modified, then a speed tilt is added to the modified P signal by looking at the speed and tilting the P signal plus when power operation is desired and tilting the P signal negative for brake operation. The speed tilt is provided in lines 114 and 115 by chopping off a little bit of the requested current to compensate for the effort required to maintain acceleration as speed increases; in effect, the requested current is added to or subtracted from, depending upon whether the control is in power or in brake, and this adds or subtracts an increment of vehicle speed. In this regard, during brake, the motor is dragging and the car is dragging, so less effort is needed from the motor current because the drag is additive; however, in power operation, the drag is against the propulsion effort, so additional motor current and effort is provided to compensate for the needed extra power to properly operate the vehicle. The provided speed tilt accomplishes this function in relation to the speed of the vehicle. For the change of the current request on field shunt in lines 116 to 118, if in field shunt operation, then the motor characteristics are different; the field shunt is field weakening, and there is a different current level needed to get the desired motor torque. The input check is provided at lines 120 to 123 to make sure that all the switches and so forth are set where they should be. The input 4 relates to the temperature of the semiconductors; this temperature in the prior art was sensed and if too high was previously used to shut everything down as an irrevocable control move. In the present system, restarting of the program is permitted after a too high semiconductor temperature is sensed. Input 4 is presently checked to see if the temperature is not too high, if it is satisfactory the ON pulse for the chopper is allowed, and the incremental loop timer goes to mode 10. If the semiconductor temperature is too high, the program goes to mode 10 and if necessary, a T5 pulse is fired; for a given cycle of program operation, it may be desired to cancel the ON pulse for that cycle or suppress the OFF pulse or shut off the T5 pulse, or even to turn on the T5, depending on what is desired. If the semiconductor temperature in the next cycle is back to a desired level, the program continues as normal to avoid a total shut-down and permit the transit vehicle to continue running. The present control provides a lessening of the provided effort to permit the equipment to continue running within capabilities and contributing some partial desired effort to the train movement.

Mode 10 of the program includes four selectable control operations—namely, CYCPP which is confirmed power, CYCBB which is confirmed brake, CYCBP which is cycling from brake to power, and CYCPB which is cycling from power to brake. These relate to differences in the desired vehicle control as to when a particular control is desired and what kind of control is desired. More specifically, for the first control operation of CYCPP which is confirmed power, it is desired to stay in power and to confirm that the control is presently in power; the field shunt is closed in lines 129 to 132 in relation to phase angle and the line voltage is cut back in line 134 in relation to low voltage. The close of the field shunt is provided to increase the train speed. To keep the current flowing in the motor, it is necessary to keep turning the chopper ON for longer periods of time to keep increasing the percentage of voltage to counteract the counter EMF of the motor. At some control point, it is desired to move to field weakening, and the control approach taken here senses the chopper being ON for 95% of the time and field weakening is then provided.

In the second operation of CYCBB which is confirmed brake, the request is to be in brake and the control operation is confirmed to be already in brake. This portion of the program permits improved control in the braking mode in relation to regeneration of power, wherein a sequence of control steps is provided in lines 147 to 151 taking progressively stronger action if the line voltage gets beyond defined limits in an effort to control the maximum level of line voltage. If the line voltage starts getting above a predetermined first limit CE, then the request is cut back by two; if the line voltage gets above a predetermined second limit D4, then the previous action has added to it a stronger reduction and so forth through greater predetermined limits to effect progressively increased current reductions due to excess line volts by suppressing ON pulses for the chopper to provide this current reduction.

A hysteresis for brake build-up is provided at lines 152 to 156 by trying to get at least a minimum predetermined current level in the brake mode after the motor armature current has been reversed for braking; this portion of the program provides the requested brake effort in conjunction with a minimum effort to assure an adequate brake current. The problem is to assure after the propulsion motors are established in the proper way to start generating brake current, that the armature current is built up in time to prevent loss of the armature current because when changing from power to electric braking, the braking armature current results from the residual magnetism left over in the field circuits of the motor. If the control apparatus does not operate fast enough and lets this residual magnetism go to zero, the armature current will not build up. In relation to a contribution to regenerative braking or electrical braking, the present control apparatus enables a build up of brake current after going to the brake mode, such that when the build up contactor is closed thereafter only ON pulses are provided with a defeat of OFF pulses until a minimum armature current is present in an effort to assure that the armature current gets started as quickly as it can and before there occurs a loss of the residual field magnetism. The propulsion motor is a series motor, so the armature and field windings are in series. After cutting the armature current to go into a brake operation, it takes a while for the field to be reenergized and this is the residual magnetism that is involved in this operation; the armature circuit is reversed for brake operation, but the field does not go to zero instantly because of residual magnetism. When it is desired to go into the brake mode of operation, the program maintains a minimum level of current in the brake mode and permits the armature current build-up in the opposite direction to an adequate level to maintain the field magnetism and still reverse the current flow in the armature; the control operation desires a current above a certain value and assures that at least this value of armature current is maintained.

0F0H:

```
1       DECLARE (K, IRW, I0,I1,I2,IR,LVL,PR,RE,TI) ADDRESS;
2       DECLARE (IL,LV,M,M0,M1,N,PH,PI,PN,P0,TT) BYTE;
3       DECLARE (S1, TOS, Z1, Q,S,SS,T,TP,TS,X,X1,X2,Y,Z) BYTE;
4       DECLARE (MODE1,MODE2,MODE3,MODE4,MODE5) LABEL;
5       DECLARE (MODE6,MODE7,MODE8,MODE9,MODE10) LABEL;
6       DECLARE (MODE11,CYCPP,CYCBB,CYCPB,CYCBP) LABEL;
7       GO TO MODE1;
8  100H: MODE1: OUTPUT(1)=0F1H; Q=0;
9       OUTPUT(5)=24H;
10      IF (INPUT(4) AND 3FH) <>12H THEN GO TO MODE1;
11      OUTPUT(6)=0B0H+Q; OUTPUT(6)=Q;
12      OUTPUT(3)=86H; OUTPUT(4)=00H;
13      LV=INPUT(5);
14      IF LV<76H THEN GO TO MODE1;
15      GO TO MODE2;

16 140H: MODE2: OUTPUT(1)=0F2H; OUTPUT(3)=14H;
17      OUTPUT(5)=34H; OUTPUT(3)=04H;
18      IF (INPUT(4) AND 3FH) <>02H THEN GO TO MODE2;
19      OUTPUT(3)=82H; OUTPUT(3)=02H;
20      M=0; M1=0; N=0; P0=00H; RE=2; TI=0; T=0;
21      TP=2; TS=0; Y=02H; Z=1;
22      GO TO MODE3;

23 1C0H: MODE3: OUTPUT(1)=0F3H;
24      IF (INPUT(4) AND 80H) =80H THEN GO TO MODE3;
25      GO TO MODE4;

26 200H: MODE4: OUTPUT(1)=0F4H;
27      OUTPUT(3)=(10H+(Y AND 0F7H));        CALL TIME(4);
28      OUTPUT(3)=90H+Y; OUTPUT(4)=SHR(IR,1);
29      OUTPUT(3)=10H+Y; CALL TIME(4);
30      OUTPUT(3)=Y;
31      GO TO MODE5;

32 260H: MODE6: OUTPUT(1)=0F6H;
33      IF (INPUT(4) AND 40H)=00H AND TS>0F0H AND Z=1 THEN DO;
```

```
34        M=1; TS=0; END;
35        IF (INPUT(4) AND 40H)=40H  THEN M=0;
36        IF TS>0F4H THEN TS=0F4H;
37        IF (INPUT(4) AND 20H)=00H  THEN M0=0; ELSE M0=1;
38        IF S>0FDH THEN M=0;
39        GO TO MODE7;

40   300H: MODE5: OUTPUT(1)=0F5H;
41        OUTPUT(6)=080H+Q; OUTPUT(6)=Q;
42        N=N+1;
43        I1=INPUT(5);
44        OUTPUT(6)=090H+Q; OUTPUT(6)=Q;
45        SS=SHR(S,3);
46        I2=INPUT(5);
47        OUTPUT(6)=0A0H+Q; OUTPUT(6)=Q;
48        I0=I1+I2;
49        IL=INPUT(5);
50        OUTPUT(6)=0B0H+Q; OUTPUT(6)=Q;
51        OUTPUT(6)=Q; OUTPUT(6)=Q;
52        LV=INPUT(5);
53        OUTPUT(6)=0C0H+Q; OUTPUT(6)=Q;
54        LVL=LV;
55        LVL=LVL+LVL+LVL;
56        S1=INPUT(5);
57        OUTPUT(6)=0D0H+Q; OUTPUT(6)=Q;
58        OUTPUT(6)=Q; OUTPUT(6)=Q;
59        PN=INPUT(5);
60        OUTPUT(6)=0E0H+Q; OUTPUT(6)=Q; OUTPUT(6)=Q; OUTPUT(6)=Q;
61        PH=INPUT(5);
62        OUTPUT(6)=0F0H+Q; OUTPUT(6)=Q; OUTPUT(6)=Q; OUTPUT(6)=Q;
63        IRW=INPUT(5); IRW=IRW+IRW+IRW+IRW;
64        GO TO MODE6;

65   400H: MODE7: OUTPUT(1)=0F7H;
66        IF PN<96H THEN PI=99H-PN;
67        IF PN>9CH THEN PI=PN-99H;
68        IF PN<9EH AND PN>94H THEN PI=0;
```

```
69      IF PN<96H AND M=1 THEN PI=0;
70      IF PN>9CH AND M=0 THEN PI=0;
71      IF PI>66H THEN PI=66H;
72      IF PN<26H THEN DO;
73         PI=66H; M=0; END;
74      IF M=1 THEN PI=PI+SHR(PI,2);
75      IF N>3 THEN DO;
76         N=0; IF LV<0C8H THEN RE=RE-1;
77         IF (M+M0=1) THEN DO;
78            T=T+1; P0=P0-1; END;
79         ELSE DO;
80            IF IRW>(I0+24H) THEN P0=P0-2;
81            IF PI>P0+1 THEN P0=P0+1;
82            IF PI<P0-1 THEN P0=P0-1; END;
83         END;
84      IF M0=0 THEN DO;
85         IF S<60H AND S>10H THEN DO;
86            IF P0>(S+S-20H) THEN P0=(S+S-20H);
87            END;
88         IF S<11H THEN P0=04H;
89         END;
90      IF P0<4 THEN P0=4;
91      IF S1>S+3 THEN S=S+1;
92      IF S>S1+3 THEN S=S-1;
93      GO TO MODE8;

94  580H: MODE8: OUTPUT(1)=0F8H;
95      IF S<09H THEN DO;
96         X=04H; IF M0=0    THEN Z=1; END;
97         ELSE X=05H;
98      IF S>33H THEN X=01H;
99      IF Z=1 THEN Y=00; ELSE DO; P0=4;  GO TO MODE11; END;
100     IF LV<6EH THEN GO TO MODE1;
101        IF IL>0C7H THEN RE=RE+2;
102     IF RE<2 THEN RE=2; IF RE+1>PR THEN RE=PR-1;
103     IF I1>I2+30H THEN Y=02H; IF I2>I1+30H THEN Y=02H;
104     IF I0>40H THEN M1=M0;
105     IF I0>IRW+0C0H THEN Y=02H;
```

```
106         IF (IO>IRW+100H) OR (IO>2F0H) THEN DO;
107            Q=0; X1=X1+30H; Y=02H; X2=00; P0=02H; IR=00H; Z=0;
108            GO TO MODE11; END;
109         GO TO MODE9;

110   720H: MODE9: OUTPUT(1)=0F9H;
111         PR=P0;
112         PR=PR+PR+PR+2FH;
113         IR=PR-RE;
114         IF (SS<IR AND M0=0) THEN IR=IR-SS;
115         IF M0=1 THEN IR=IR+SS;
116         IF (INPUT(4) AND 02H)=00H THEN IR=IR+49H;
117         IF IR>1FFH THEN IR=1FFH;
118         IF IR<49H THEN IR=49H;
119         IF (INPUT(4) AND 1DH) <> 00 THEN TT=0;
120         IF TT<06H THEN DO;    P0=4;Y=03H; END; ELSE DO;
121         TT=70H; END;
122         IF (INPUT(4) AND 08H)=08H THEN Y=0BH;
123         TT=TT+1;
124         GO TO MODE10;

125   800H: MODE10: OUTPUT(1)=0FAH;
126     CYCPP: IF M=1 AND M0=1 THEN DO;
127            OUTPUT(1)=8AH; Q=0; TI=0; T=0; X1=10H;
128         IF PH>0E5H THEN DO;
129            TP=TP+1; IF TP>13H THEN TP=13H;
130            IF TP>10H THEN X2=80H; END;
131         IF PH<0D0H THEN DO;
132            TP=TP-1; IF TP<2 THEN TP=2;
133            END;
134         IF IRW>LVL THEN RE=RE+2;
135         GO TO MODE11;
136         END;

137     CYCBB: IF M=0 AND M0=0 THEN DO;
138            OUTPUT(1)=1AH; T=0;
139          ; TS=TS+1; TP=2; TI=TI+1; IF TI>200H THEN TI=200H;
```

```
140     X1=30H; X2=00H; T=0; Q=00H;
141     IF S>009H THEN Q=0FH;
142     IF S<1AH THEN DO; Y=02H; IR=0; GO TO MODE11; END;
143     IF S>78H THEN Q=07H;
144     IF S>96H THEN Q=03H;
145     IF S>0B4H THEN Q=01H;
146     IF S>0D3H THEN Q=00H;
147   IF LV>0CEH THEN RE=RE+2;
148   IF LV>0D4H THEN RE=RE+3;
149   IF LV>0DAH THEN RE=RE+4;
150   IF LV>0E0H THEN RE=RE+5;
151   IF LV>0E6H THEN Y=02H;
152     IF I0<30H THEN K=030H;
153     IF I0>80H THEN K=30H;
154     IF I0<80H AND TI<190H AND M1=1 THEN X=X+2;
155     IF I0<K   THEN DO; Y=Y+04H; TOS=0; END; ELSE DO;
156        TOS=TOS+1; IF TOS<2 THEN Y=Y+04H; IF TOS>8 THEN TOS=8; END;
157     IF LV>0FDH THEN Z1=1;
158     IF Z1=1 THEN DO;
159        X1=70H; Q=0; Y=0AH;        IR=2; END;
160     GO TO MODE11; END;

161   CYCBP: IF M=0 AND M0=1 THEN DO;
162       OUTPUT(1)=4AH; TS=TS+1; TI=0;
163       IF ((INPUT(4) AND 02H) =02H) AND (IR<99H) THEN Y=02H;
164       IF IR<50H THEN Y=02;
165       IF P0<5 AND ((I0<3FH) OR (T>0F0H)) THEN DO;
166          X1=30H; X2=00H; END;
167       GO TO MODE11; END;

168   CYCPB: IF M=1 AND M0=0 THEN DO;
169       OUTPUT(1)=2AH; TP=2;
170       Z1=0;
171       IF IR<50H THEN Y=02;
172       IF P0<5 AND ((I0<3FH) OR (T>0F0H)) THEN DO;
173          X1=10H; X2=00H; END;
174       IF (T>0D8H) AND (I0>3FH) THEN DO;
```

```
175            X1=50H; X2=00H;END;
176            GO TO MODE11; END;
177   0AC0H: MODE11: OUTPUT(1)=0BH;
178            OUTPUT(5)=(X+X1+X2);
179            GO TO MODE3;

180       EOF;
```

I claim:

1. In control apparatus for a chopper operative with a power supply and having an ON operation and an OFF operation, said chopper being operative to control the energization of an electric motor, the combination of means for providing a first pulse signal having a first time period and a second pulse signal having a second time period greater than said first time period and including said first time period within the second timer period of the second pulse signal, means responsive to the provision of said first pulse signal for determining the ON operation of said chopper, and means responsive to the provision of said second pulse signal for determining the continued operation of said chopper with said power supply.

2. The control apparatus of claim 1, with the first time period of said first pulse signal having a predetermined position within the second time period of said second pulse signal.

3. The control apparatus of claim 1, including means responsive to said second pulse signal to provide a third pulse signal outside of the second time period for determining said OFF operation of said chopper.

4. The control apparatus of claim 1, with said second pulse signal determining said OFF operation to prevent the provision of said OFF operation during the second time period.

5. The control apparatus of claim 1, with said means responsive to said second pulse signal including an operation enable apparatus for providing an output signal to determine the operation of said chopper with said power supply.

6. In the method of controlling a chopper operative with a power supply to energize an electric motor, said chopper having an ON operation and an OFF operation, the steps of providing a first pulse signal for a first period of time and a second pulse signal for a second period of time, with the first period of time of said first pulse signal being less than and occurring within the second period of time said second pulse signal, determining the ON operation of the chopper in response to said first pulse signal, and determining the continued operation of the chopper in response to the provision of said second pulse signal.

7. The method of claim 6, including the step of determining the OFF operation of the chopper outside of the second period of time in response to said second pulse signal.

8. The method of claim 6, including the step of providing a third pulse signal outside the second period of time in response to said second pulse signal for determining the OFF operation of the chopper.

9. The method of claim 6, with the time occurrence of the first pulse within the second pulse being related to the operational time characteristic of the chopper.

* * * * *

UNITED STATES PATENT AND TRADEMARK OFFICE
CERTIFICATE OF CORRECTION

PATENT NO. : 4,090,115
DATED : May 16, 1978
INVENTOR(S) : James H. Franz, Jr.

It is certified that error appears in the above-identified patent and that said Letters Patent are hereby corrected as shown below:

On column 25, line 25 of claim 1, change "timer" to -- time --.

Signed and Sealed this

Ninth Day of June 1981

[SEAL]

Attest:

RENE D. TEGTMEYER

Attesting Officer

Acting Commissioner of Patents and Trademarks